(No Model.)
C. PROSCH.
SHUTTER FOR PHOTOGRAPHIC CAMERAS.
No. 312,581. Patented Feb. 17, 1885.
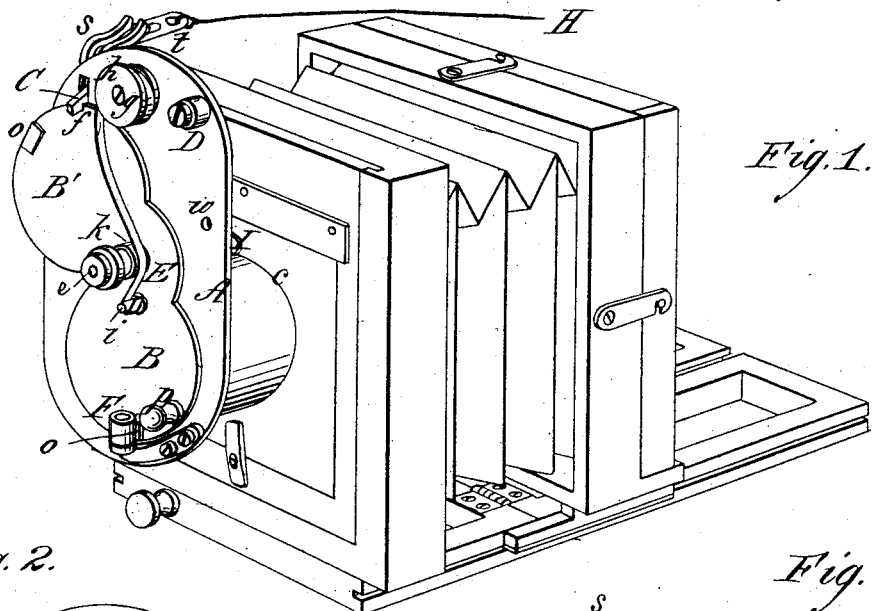
Fig. 1.
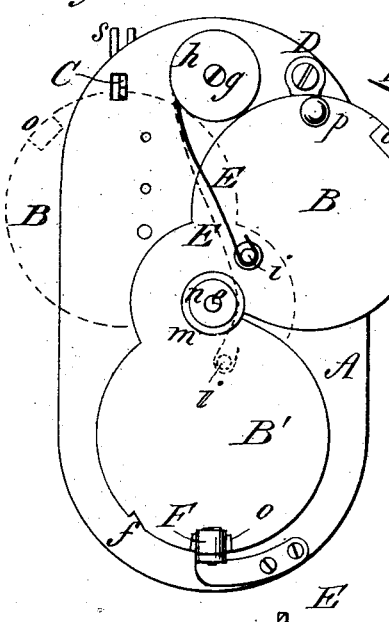
Fig. 2.
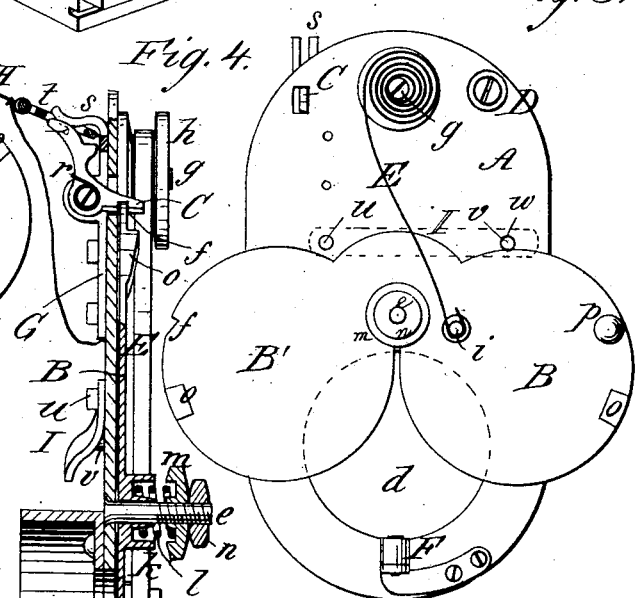
Fig. 3.
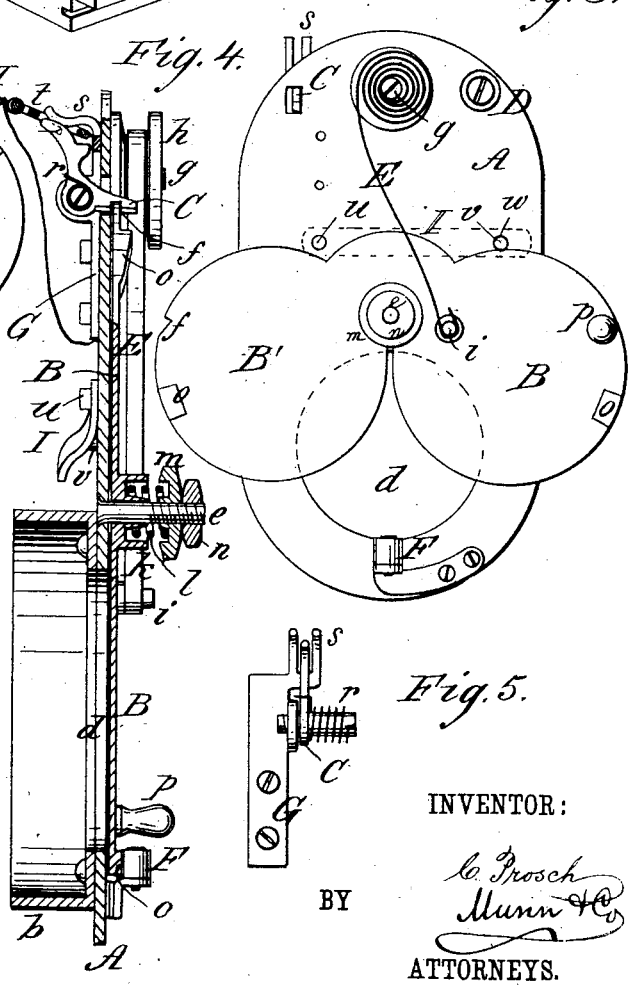
Fig. 4.
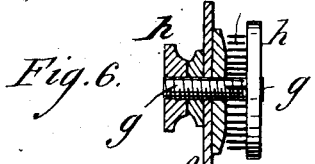
Fig. 6.
Fig. 5.
WITNESSES:
Donn Twitchell
C. Sedgwick
INVENTOR:
C. Prosch
BY Munn & Co
ATTORNEYS.

UNITED STATES PATENT OFFICE.

CYRUS PROSCH, OF NEW YORK, N. Y., ASSIGNOR TO E. & H. T. ANTHONY & CO., OF SAME PLACE.

SHUTTER FOR PHOTOGRAPHIC CAMERAS.

SPECIFICATION forming part of Letters Patent No. 312,581, dated February 17, 1885.

Application filed January 21, 1884. (No model.)

*To all whom it may concern:*

Be it known that I, CYRUS PROSCH, of the city, county, and State of New York, have invented a new and useful Improvement in Shutters for Photographic Cameras, of which the following is a full, clear, and exact description.

This invention more particularly relates to shutters of cameras for instantaneous or rapid photographing; and it consists in a novel manner of applying the spring used to throw the shutter, whereby the shutter has a gradual or slow action at starting, which avoids jar and prevents damage to the picture. It also includes an adjustable spring friction device for varying the working speed of the shutter, to give a shorter or longer exposure of the sensitive plate; also, means for insuring the perfect exclusion of light when the shutter is closed; a spring-trigger for holding and releasing the shutter; also, a trigger-guard in combination therewith, and special means for operating the trigger; likewise, a spring catch or device for holding the shutter in a partially-closed position for focusing, substantially as hereinafter described.

Reference is to be had to the accompanying drawings, forming a part of this specification, in which similar letters of reference indicate corresponding parts in all the figures.

Figure 1 represents a view in perspective of a photographic camera with my invention applied, and showing the shutter in its closed and locked position before taking the picture; Fig. 2, an outside face view of the shutter holder or carrier, with its attachments for controlling the shutter, and showing by full lines the position of the shutter after the picture has been taken; also, in part, by dotted lines, its position, as in Fig. 1, and by full and dotted lines the spring which throws the shutter in its correspondingly-changed positions. Fig. 3 is a similar view to Fig. 2, but showing the shutter as open for focusing. Fig. 4 is an irregular vertical section, upon an enlarged scale, of the shutter-carrier, with shutter and other attachments in the position they occupy in Fig. 1. Fig. 5 is an inside face view of the trigger-holder and trigger used to lock the shutter and liberate it when taking the picture. Fig. 6 is a partly-sectional view of means used for varying the tension of the spring which throws the shutter.

A is the shutter-carrier, which consists, mainly, of a plate having a socket-projection, $b$, on its inner face at or near its one end, for fitting over the outer end of the lens-tube $c$ of the camera, and having an opening, $d$, through it, which is concentric with the lens-tube. Said shutter-carrier is designed as a removable attachment to the camera, so that when not required to take instantaneous pictures said carrier, with its appendages, may, if desired, be removed and the camera be used for photographing in the ordinary manner.

The shutter, as usual for instantaneous or rapid photographing, is a double-action fly one controlled by a spring, and consists of two connected disks or shutter-sections, B B', arranged to work on or about an intermediate pivot, as at $e$, said shutter-sections moving over the outer face of the carrier A and alternately closing the opening $d$ before and after taking the picture, after focusing, to produce the necessary impression during the movement of the shutter, when released, for action by the spring which throws it. The extent of the movement of the shutter is between a trigger, C, which engages with a notch, $f$, in the one shutter-section, B', and a stop, D, against which the other shutter-section, B, strikes, when the shutter is thrown by its spring E, both of which positions or limits are shown, respectively, by full lines in Figs. 1 and 2 of the drawings. The spring E is peculiar in its arrangement and action upon the shutter. Thus it is coiled at its one end around a stationary post, $g$, to which it is made fast, and is connected at its other and outer extended end, that is free to pass beyond and to one side of the shutter-pivot $e$ to a stud, $i$, on the shutter-section B, or in eccentric relation with the working center of the shutter, said spring being extended beyond the pivot $e$, or beyond a fulcrum or bridge, $k$, when the shutter-section B closes the opening $d$, and the other section, B', is held by the trigger C, and said spring when so extended being bent over said fulcrum, as shown by full lines in Fig. 1 and by dotted lines in Fig. 2. By this construction and arrangement of the spring E, when the trigger C is released to throw the shutter for the purpose of taking the picture, the first action of the spring at its free end, as bent over the fulcrum $k$, will be that of a short crank and be very gradual or slow, which prevents all jar at the starting of the shutter liable to mar the impression, and not until the spring clears its bent lap over said fulcrum will it be rapidly coiled or drawn in. The gradual movement of the shutter at starting is very important, in order to secure a good impression. The post $g$, to which the coiled end of the spring E is attached, is fitted to turn in the plate A, and is clamped to its place by a screw nut or nuts, $h$, whereby provision is made for adjusting the tension of the spring. The fulcrum or bridge $k$, which is here shown in the form of a box fast on the shutter and concentric with the pivot $e$, holds a pressure or brake spring, $l$, arranged around the pivot $e$, the pressure on which is regulated by the nut $m$ and lock-nut $n$. When considerable pressure is exerted on the pressure or brake spring, it acts as a brake, causing the shutter to revolve slowly, and when the pressure is decreased the shutter will revolve with correspondingly increased speed. Thus the time of exposure of the sensitive plate can be regulated at will. The stop D, against which the shutter-section B strikes after the shutter has been thrown by the spring E, is formed, mainly, of a rubber cushion, to prevent jar liable to injure the impression.

To secure a perfect closing of the lens-tube opening $d$ when either shutter-section B B' is brought up over it, and to prevent the springing away of said sections when in such position, so as to preclude all entry of light to the lens of the camera, said shutter-sections are thickened or provided with slight projections or wedges $o$ on their backs, which projections pass under a roller or other pressure device, F, to force the shutter close up against the carrier A, over or around the opening $d$.

The shutter is or may be adjusted into the position represented for it in Fig. 1 from the position shown for it by full lines in Fig. 2 against the tension of the spring E by means of a handle, $p$, on the shutter, when the trigger C engages with the notch $f$. The trigger C may be carried by a support, G, secured to the back of the plate or carrier A, and is kept in a position to engage with the notch $f$ in the shutter by a spring, $r$, and has combined with it a guard, $s$, which the tail end of the trigger meets. The independent link or hook $t$ is attached to an operating-cord, preferably at a short distance from one end, which end is secured to the shutter-carrier A. The other end, which is free, may be of any desired length. The link $t$ is slipped by the fingers between the tail of the trigger and the guard, and then forms a detachable trigger-operating device to release the shutter from a locked position, as shown in Fig. 1. When it is required to release the trigger from the shutter, it is only necessary to pull on the cord, when the hook $t$ will slip out between the tail of the trigger and the guard, which depresses the trigger and releases the shutter, the loop at the same time disengaging itself. Thus, though the operator may give a very sudden and long pull to the cord, it cannot jar the camera, as does occur when the releasing is by the direct pressure of the hand to the trigger, or when a cord is attached permanently, unless very great care is taken.

For the operating-cord I prefer to use an elastic one, as when suddenly jerked it is less likely to jar the camera than when a non-elastic cord is used.

The trigger can be operated without the guard, if care is taken; but the guard insures its perfect working, even if carelessly operated.

To focus by the camera, a spring lever or catch, I, pivoted, as at $u$, to the back of the plate or carrier A, and having a pin or projection, $v$, on its face, is moved so as to cause said pin to pass out through a hole, $w$, in the carrier A, located so that when the shutter is adjusted against the tension of the spring E into a crosswise position relatively to the carrier, so as to leave the aperture $d$ partly exposed, as shown in Fig. 3, the shutter will be held in such half-open position by said pin. By moving this spring catch or holder I out of the way again and its pin $v$ out of line with the hole $w$, the shutter is then free to be operated as before.

Having thus described my invention, I claim as new and desire to secure by Letters Patent—

1. In shutters for photographic cameras, the combination, with the pivoted shutter, of a spiral spring for throwing the same, having one end secured to a stationary post and its other end connected to the shutter in eccentric relation with the pivot thereof, whereby the spring in the starting of the shutter is moved gradually and all jar is avoided, substantially as herein shown and described.

2. The combination, with the shutter B B' and its operating-spring E, of the adjustable post $g$, secured by a clamping nut or nuts, and having the coiled end of said spring attached to it, whereby provision is made for adjusting the tension of the spring, essentially as described.

3. The combination of an adjustable spring-pressure device with the double-acting shutter and its carrier or plate, and spring for throwing the shutter, whereby more or less friction may be put upon the shutter to retard or quicken its action, essentially as described.

4. The double-acting shutter, thickened or provided with projections $o$ $o$ on the backs of its sections, in combination with a pressure device, under which said projections pass when the shutter is closed, and the shutter carrier or plate A, substantially as and for the purpose herein set forth.

5. The combination, with the spring-trigger and the shutter held and released by the trigger, of a trigger-guard arranged to secure the operation of the trigger by the sliding of a loop or trigger operating device between said guard and the tail of the trigger, substantially as specified.

6. The link or slotted trigger-operating device $t$ and cord H, in combination with the spring-trigger, its guard, and the pivoted shutter, essentially as described.

7. The combination, with the shutter B B' and its carrier or plate A, of the spring lever or catch I, constructed and arranged to act as a stop to the shutter when half or partially closed, essentially as and for the purpose herein set forth.

CYRUS PROSCH.

Witnesses:
 EDGAR TATE,
 ALFRED H. DAVIS.